3,535,603
MOTOR DRIVE SYSTEM FOR LIFTING DEVICES
Werner Droste and Hans-Hermann Stammer, Hamburg, Germany, assignors to Licentia Patent-Verwaltungs-G.m.b.H., Frankfurt am Main, Germany
Filed May 17, 1967, Ser. No. 639,075
Claims priority, application Germany, Sept. 9, 1966, L 54,495
Int. Cl. H02p 7/68
U.S. Cl. 318—105
11 Claims

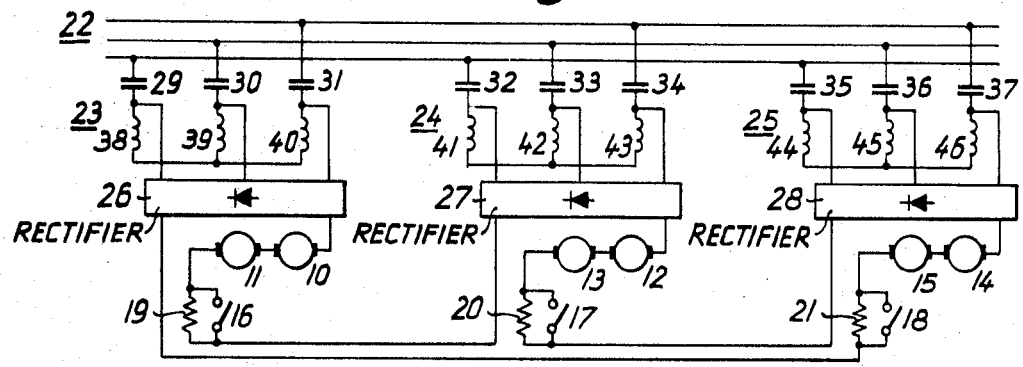
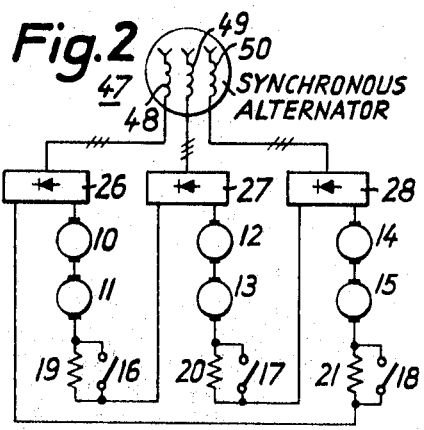
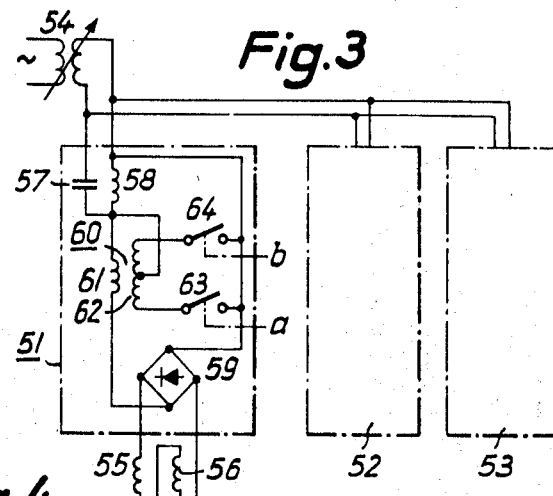
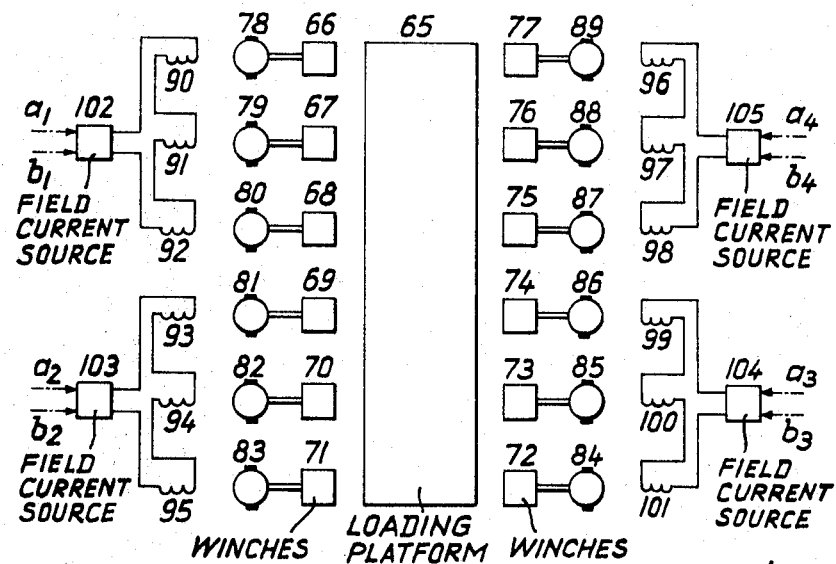

ABSTRACT OF THE DISCLOSURE

A plurality of equal power D.C. motors are coupled together in groups with one or more motors in each group, and a plurality of high impedance D.C. current sources are each coupled in series between the motors of two respective motor groups to form a series circuit in which the current sources are interspersed among the motor groups. A common voltage source is coupled to all of the current sources, which are isolated from each other with respect to D.C. voltages, and separate, variable field current sources are coupled to the motors of individual groups. The field current sources are controlled by a control signal to vary the motor torque between motor groups.

BACKGROUND OF THE INVENTION

This invention relates to a D.C. motor drive system for a lifting device having a plurality of equal power D.C. motors which are fed by at least one current source. Motor drive systems of this type are commonly found in winch systems for loading and unloading ships.

With such a lifting device it is important that all hawsers carry approximately the same load, because if one hawser is overloaded it might easily break and thus distribute the total load even more unevenly so that the remaining hawsers might break in succession.

In the past, D.C. motor drive systems have been used in which the D.C. motors were fed by a motor-generator or by some other D.C. generator, but this has involved several disadvantages. In a Ward-Leonard set, for example, the generator-commutator is very sensitive, bulky, heavy, and expensive. Furthermore, if several drive motors with independently adjustable torque are required, these drive motors can not be operated in one single Ward-Leonard hoist. To eliminate the latter difficulties, a constant power circuit has been introduced in the past in which several series-connected generators feed one constant-power circuit in which the drive motors are also series-connected. But, the disadvantages mentioned above for the motor-generator also apply here. Motors and generators can be taken out of operation in a constant power circuit only after previously being de-energized, bridged, and separated from the circuit, which requires a large, complicated control circuit. When a large number of D.C. motors is used, these motors can not be series-connected, since they would then have to be insulated for a multiple of their normal voltage in order to protect them against insulation breakdown. In this case, D.C. generators and D.C. motors have been alternatingly series-connected in a so-called "mixed series" circuit.

It is, however, not possible with the above-mentioned drive means, when a large number of D.C. motors is employed with a smaller number of D.C. generators, to adjust the D.C. motors individually and in a simple manner to compensate for varying drive requirements and simultaneously to influence the distribution of the total torque of all motors among the individual motors.

SUMMARY OF THE INVENTION

The object of this invention is to solve the above-noted problems by providing an improved D.C. motor drive system. In accordance with this invention, a plurality of equal power D.C. motors are coupled together in groups with one or more motors in each group, and a plurality of high impedance D.C. sources are each coupled in series between the motors of two respective motor groups to form a series circuit in which the current sources are interspersed among the motor groups. If the current sources are fed from a common voltage source, they are isolated from each other with respect to D.C. voltages.

In accordance with this invention, one possible arrangement of the current sources, among others, is to provide at least one synchronous alternator and to feed at least two rectifiers through the same number of separated stator windings of the synchronous alternator. The torque put out by all D.C. motors can be easily varied by changing the armature current common to all D.C. motors through adjustment of the synchronous alternator's field excitation, while the torque of the individual motors can be independently changed by varying the field excitation of the individual motor groups.

Another possible arrangement of the current sources for this invention is based on the known quality of a Boucherot-circuit, which consists essentially of the series connection of an inductance with a capacitance, to generate a constant A.C. current while being fed by a constant A.C. voltage. In accordance with this invention, at least one Boucherot-circuit and a corresponding rectifier is provided as the high impedance current source. When a plurality of rectifiers are used, each is coupled to a corresponding star-connected Boucherot-circuit, and the condensers of the Boucherot-circuits are connected between the input and output thereof, thereby providing D.C. isolation for the current sources in a particularly simple manner. Because of their simple construction and lack of need for maintenance, the Boucherot-circuits are preferable over the more complicated synchronous alternators if a sufficiently stable voltage source is available to feed them.

During a lowering operation, the D.C. motors of a lifting device change to generator operation. Since the direction of power can not be reversed in the rectifiers of the drive means according to this invention, damping resistors must be provided, which can simply comprise a resistor coupled in series with the motor group and a shorting switch coupled in parallel with the resistor.

BRIEF DESCRIPTION OF THE DRAWINGS

FIG. 1 is a schematic circuit diagram of one embodiment of the invention.

FIG. 2 is a schematic circuit diagram of another embodiment of the invention.

FIG. 3 is a schematic circuit diagram of a field current supply circuit of this invention for use in combination with the embodiments shown in FIGS. 1 and 2.

FIG. 4 is a block diagram showing the application of this invention to a multi-motor hoist system.

DESCRIPTION OF THE PREFERRED EMBODIMENTS

In FIG. 1, D.C. motors 1 to 15 are of equal power and form three groups of two motors each, with damping resistors 19, 20, 21 connected in series with a corresponding motor group and shorting switches 16, 17, and 18 connected in parallel with a corresponding resistor. Opening the shorting switches places the associated resistor in series to provide a damping action. To supply current from a stable three-phase A.C. source 22, identical three-phase Boucherot-circuits 23, 24, and 25 with corresponding rectifiers 26, 27, and 28 are provided with the rectifiers connected alternatingly with the groups of D.C. motors in a so-called "mixed series" circuit.

The three-phase Boucherot-circuits 23, 24, and 25, which as shown in FIG. 1 consists of the series connection of the capacitors 29–37 with the inductances 38 to 46 respectively, are each star-connected and have the condensers 29 to 37 and inductances 38 to 46 arranged in three identical phase branches. The condensers 29 to 37 are connected between the respective input terminals of the three phase Boucherot-circuits 23, 24, and 25, which are fed by the three-phase source 22, and the respective output terminals of the same one of the Boucherot-circuits, which feed the rectifiers 26, 27, and 28, so that no direct current conductive path exists between the inputs of the rectifiers 26, 27, and 28.

In FIG. 2, a different embodiment is shown in which the rectifiers 26, 27, and 28 are fed by a synchronous alternator 47, whose three stator windings 48, 49 and 50 are separated from each other. Therefore, in this embodiment there is also no direct current conductive path between the inputs of rectifiers 26, 27, and 28. In accordance with this invention, the field current of all D.C. motors within a group is identical under all operating conditions, and during normal operation the field currents of all the motor groups are identical, but the field currents of each D.C. motor group can be individually changed in accordance with at least one control signal. This is done in a particularly simple manner by connecting the field windings of all D.C. motors in a group in series with each other and feeding them from a common D.C. field current source, the field current source for each motor group being separate from each other but identical in structure.

A field current supply constructed in this manner has the additional advantage of making it possible to change the torque put out by all D.C. motors in a simple manner by changing the excitation of the synchronous alternator. If Boucherot-circuits are utilized as power sources for the rectifiers feeding the D.C. motors instead of a synchronous alternator, a simple adjustment of the Boucherot-circuits corresponding to an adjustment in the excitation of the synchronous alternator is not possible. In this case, according to the invention, the field current sources are coupled to a common variable field voltage sources and the torque of all the motors is adjusted by holding their armature current constant and varying the voltage of the common field voltage source, thereby varying the field current of all of the motors simultaneously.

According to the invention, Boucherot-circuits with corresponding rectifiers are utilized as the field current sources with means being provided for individual adjustment of the current output of the Boucherot-circuits or their rectifiers. The adjustment means for the output current of the Boucherot-circuit comprises at least one transformers connected to the output of the Boucherot-circuit. The primary winding of this transformer is connected in series with the corresponding rectifier and its secondary winding is connected in parallel with the output of the Boucherot-circuit and is variable in response to at least one control signal. The above-described field current supply and control circuit is shown in FIG. 3.

In FIG. 3, one field current source 51, 52, 53 is provided for each D.C. motor group to feed the field windings of the D.C. motors. All field current sources 51, 52, 53 are identical in structure and are fed by a common voltage source comprising an adjustable transformer 54. The output of the field current sources are connected in series to the field windings of the D.C. motors of the corresponding D.C. motor group, as for example, to the field windings 55 and 56 for the D.C. motors 10 and 11 (FIG. 1). Thus, an adjustment of the transformer 54 will change the torque output of all D.C. motors 10 to 15 (FIG. 1) independently of their armature current.

The circuit for the field current sources 51, 52 and 53 is shown in detail for field current source 51. Field current source 51 is a Boucherot-circuit containing a condenser 57 and an inductance 58, which a rectifier 59 coupled to the output of the circuit. A variable transformer 60 is provided to serve as adjustment means for the current transmitted from the Boucherot-circuit to the rectifier 59. The primary winding 61 is in series with rectifier 59, and the two secondary windings, combined into one common center-tapped secondary winding 62, can be connected in parallel with the output of the Boucherot-circuit by switches 63 and 64, which are actuated by two control signals $a$ and $b$. (Signals $a$ and $b$ never occur simultaneously.) Thus it is possible, for example, to increase the current transmitted from the Boucherot-circuit to the rectifier 59 by closing the switch 63 upon receipt of control signal $a$, and to decrease the same current by closing the switch 64 upon receipt of control signal $b$. This produces a corresponding adjustment of the torque of the D.C. motors 10 and 11 (FIG. 1) of the associated D.C. motor group.

The D.C. motor drive means according to the present invention can be utilized with particular advantage in lifting devices which lift bodies of rectangular cross-section that have to be maintained in a horizontal position. Such bodies, for example, may comprise rigid, rectangular platforms for loading and unloading ships. Previously such platforms were lifted by D.C. drive means operated in a Ward-Leonard set, or by mechanically or artificially synchronized A.C. motors. Insurmountable difficulties arose, however, in the construction of very large lifting devices of this type due to the tendency of these prior art drive means to be unstable when started or stopped or under varying load conditions. These difficulties, however, have been obviated in the D.C. motor drive system of this invention.

For the above-noted type of lifting device, the present invention utilizes at least two D.C. motor groups each coupled to winches on two opposing sides of the rectangular body to be lifted, with the field currents of each two D.C. motor groups being adjustable in accordance with at least one control signal.

FIG. 4 shows the circuit of such a lifting device. A rectangular platform 65, shown in plan view, can be lifted and lowered by winches 66 to 77 which are each driven by a corresponding D.C. motor 78 to 89. The D.C. motors 78 to 89, according to the present invention, are connected in four D.C. motor groups along the narrow sides of the platform 65. Their armatures are fed in the manner shown in FIG. 1, which is not repeated in FIG. 4. Their field windings 90 to 101 are fed, corresponding to their association with a particular motor group, by four field current sources 102, 103, 104, and 105, whose circuits correspond to the field current circuits shown in FIG. 3. Lifting, lowering, and holding of the platform 65 are controlled by means of variations in the field voltage source, again as shown in FIG. 3.

Deviations of the platform from the horizontal position can be corrected by an increase in the torque in the D.C. motors of two adjacent D.C. motor groups, or better by means of increasing the torque of two adjacent motors and simultaneously decreasing the torque of the remaining D.C. motor groups.

Suppose, for example, that the platform 65 deviates from the horizontal position in such a manner that its left side is too low. Its horizontal position can then be restored by increasing the torque of the D.C. motors 78 to 83 of the D.C. motor groups controlled by field current sources 102 and 103 by means of the signals $a_1$, $a_2$, and/or by decreasing the torque of the D.C. motors 84 to 89 of the D.C. motor groups controlled by the field current sources 104 and 105. In this type of control, interlocking devices must be used to assure that the alignment of the platform 65 in its longitudinal and lateral axis does not occur simultaneously, since the simultaneous occurence of the signals $a$ and $b$ in FIG. 3, which correspond to the signal $a_1$ and $b_1$ in FIG. 4, would short-circuit the secondary winding 62 of the transformer 60 shown in FIG. 3.

The horizontal position of platform 65 can be automatically maintained by deriving the signals $a_1$ to $a_4$ and $b_1$ to $b_4$, as explained above, from an inclinometer mounted on platform 65.

A further type of control can be based on a diagonal tilt of the platform. In this case, the torque of the D.C. motors of two D.C. motor groups each disposed on diagonally opposite corners of the platform must simultaneously be adjusted in opposing direction, while the torque of the D.C. motors of the remaining D.C. motor groups remains unchanged.

It will be understood that the above description of the present invention is susceptible to various modifications, changes, and adaptations, and the same are intended to be comprehended within the meaning and range of equivalents of the appended claims.

We claim:
1. A D.C. motor system comprising, in combination:
  (a) a plurality of equal power D.C. motors arranged in groups with one or more motors in each group, the motors of the same group being coupled together;
  (b) a common A.C. voltage source; and
  (c) a plurality of D.C. current sources each coupled in series between the motors of two respective motor groups to form a series circuit in which the current sources are interspersed among the motor groups, each of said D.C. current sources comprising a separate rectifying means and a means coupling said rectifying means to said common A.C. voltage source for isolating said current sources from each other with respect to D.C. voltages so that no direct current conductive path exists between the inputs of said rectifying means.

2. A D.C. motor system as defined in claim 1, wherein said voltage source comprises a synchronous alternator, and wherein each of said D.C. current sources comprises a separate stator winding in said synchronous alternator and a rectifier coupled to the stator winding, the stator windings being isolated from each other with respect to D.C. voltages.

3. A D.C. motor system as defined in claim 2, wherein said D.C. current sources are coupled in series with the armature windings of said D.C. motors, and further comprising means for varying the excitation of said synchronous alternator to simultaneously vary the torque output of each of said D.C. motors by varying the armature current thereof.

4. A D.C. motor system comprising, in combination:
  (a) a plurality of equal power D.C. motors arranged in groups with one or more motors in each group, the motors of the same group being coupled together;
  (b) a plurality of relatively high impedance D.C. current sources each coupled in series between the motors of two respective motor groups to form a series circuit in which the current sources are interspersed among the motor groups;
  (c) a common voltage source coupled to all of said D.C. current sources;
  (d) means in each of said D.C. current sources for isolating the current sources from each other with respect to D.C. voltages;
  (e) said voltage source comprising a three-phase A.C. voltage source; and
  (f) each of said D.C. current sources comprising a star-connected Boucherot-circuit coupled between said A.C. voltage source and a corresponding rectifier, the condensers of the Boucherot-circuit being connected between the input thereof and said three-phase A.C. voltage source.

5. A D.C. motor system as defined in claim 2 and further comprising a damping resistor coupled in series with each of said motor groups and a switch coupled in parallel with each of said damping resistors.

6. A D.C. motor system as defined in claim 1, wherein the field windings of the D.C. motors in the same group are coupled together and further comprising a separate adjustable current source coupled to the field windings of each motor group for individually adjusting the field current thereof in response to at least one control signal.

7. A D.C. motor system as defined in claim 6, wherein the field windings of the D.C. motors in the same group are coupled together in series and wherein the adjustable current sources coupled to the field windings of each motor group are identical.

8. A D.C. motor system comprising, in combination:
  (a) a plurality of equal power D.C. motors arranged in groups with one or more motors in each group, the motors of the same group being coupled together;
  (b) an A.C. voltage source;
  (c) a plurality of D.C. current sources each coupled in series between the motors of two respective motor groups to form a series circuit in which the current sources are interspersed among the motor groups, each of said D.C. current sources comprising a separate rectifying means and means coupling said rectifier to said A.C. voltage source for isolating the current sources from each other with respect to D.C. voltages so that no direct current conductive path exists between the inputs of said rectifying means;
  (d) an adjustable current source coupled to the field windings of each motor group for individually adjusting the field current thereof in response to at least one control signal, the field windings of the D.C. motors in the same group being coupled together; and
  (e) a common voltage source coupled to all of said adjustable current sources for supplying current thereto and means for varying the torque of all of the D.C. motors by varying the voltage of said common voltage source.

9. A D.C. motor system comprising, in combination:
  (a) a plurality of equal power D.C. motors arranged in groups with one or more motors in each group, the motors of the same group being coupled together;
  (b) a plurality of relatively high impedance D.C. current sources each coupled in series between the motors of two respective motor groups to form a series circuit in which the current sources are interspersed among the motor groups;
  (c) the field windings of the D.C. motors in the same group being coupled together and further comprising an adjustable current source coupled to the field windings of each motor group for individually adjusting the field current thereof in response to at least one control signal; and
  (d) said adjustable current sources each comprising a Boucherot-circuit connected to a rectifier and further comprising means for adjusting the current output of the Boucherot-circuits or the rectifiers.

10. A D.C. motor system as defined in claim 9, wherein said means for adjusting the current output of said Boucherot-circuit comprises at least one transformer connected to said Boucherot-circuit, the primary winding of said transformer being coupled in series with the associated rectifier, and the secondary winding of said transformer being connected in parallel with the output of the Boucherot-circuit in dependence on at least one control signal.

11. A D.C. motor system as defined in claim 6, wherein the motors are coupled to a plurality of winches that serve to lift a body of rectangular cross-section which has to be maintained in a horizontal position, and wherein at least two D.C. motor groups coupled to winches are provided on each one of two opposing sides of the body to be lifted, and wherein the field currents of each two D.C. motor groups are simultaneously adjustable in dependence on a control signal.

References Cited

UNITED STATES PATENTS

| | | | |
|---|---|---|---|
| 1,136,621 | 4/1915 | Shallcross | 318—63 |
| 2,515,987 | 7/1950 | Cook | 318—99 |
| 2,786,974 | 3/1957 | Asbury | 318—149 |
| 3,422,339 | 1/1969 | Baker | 310—68 |
| 3,419,786 | 12/1968 | Brane | 321—27 |

FOREIGN PATENTS

| | | |
|---|---|---|
| 1,123,035 | 2/1962 | Germany. |
| 954,810 | 4/1964 | Great Britain. |

ORIS L. RADER, Primary Examiner

A. G. COLLINS, Assistant Examiner

U.S. Cl. X.R.

321—27